United States Patent
Kaneko et al.

[11] 3,831,702
[45] Aug. 27, 1974

[54] SAFETY BELT DEVICE

[75] Inventors: Yuichiro Kaneko, Nagoya; Fuminori Teraoka, Konan; Tatsushi Kubota, Heguri-gun; Takehiko Nishikawa, Inazawa, all of Japan

[73] Assignee: Kabushiki-Kaisha Tokai-Rika-Denki-Seisakusho, Nishikasugai-gun, Aichi-Pref, Japan

[22] Filed: Oct. 24, 1972

[21] Appl. No.: 299,808

[30] Foreign Application Priority Data
Oct. 25, 1971 Japan.............................. 46-84475

[52] U.S. Cl................ 180/82 C, 180/111, 180/112, 280/150 SB, 248/306
[51] Int. Cl............................................. B60r 21/10
[58] Field of Search ...................... 180/82 C, 82 R; 280/150 SB, 150 B; 248/306; 297/388

[56] References Cited
UNITED STATES PATENTS

| | | |
|---|---|---|
| 1,219,045 | 3/1917 | Schmidt.............................. 248/306 |
| 2,768,003 | 10/1956 | Apel et al....................... 280/150 B |
| 3,182,923 | 5/1965 | Botar............................ 280/150 SB |
| 3,363,712 | 1/1968 | Fontaine............................ 297/388 |
| 3,506,083 | 4/1970 | Botnick............................ 180/82 C |
| 3,583,726 | 6/1971 | Lindblad...................... 280/150 SB |
| 3,613,819 | 10/1971 | Maloney......................... 280/150 SB |
| 3,653,714 | 4/1972 | Gentile.............................. 180/82 C |
| 3,663,037 | 5/1972 | Wohn-Machowski........... 280/150 B |
| 3,712,401 | 1/1973 | Rothschild........................ 180/82 C |
| 3,727,944 | 4/1973 | Wize.............................. 280/150 SB |
| 3,764,161 | 10/1973 | Bright et al....................... 180/82 C |
| 3,770,078 | 11/1973 | Keppel et al...................... 180/111 |

FOREIGN PATENTS OR APPLICATIONS 1,327,052    4/1963    France ......................... 280/150 SB Primary Examiner—David Schonberg
Assistant Examiner—John P. Silverstrim
Attorney, Agent, or Firm—Stevens, Davis, Miller & Mosher

[57] ABSTRACT

A safety belt device for use in vehicles, including a belt which is extended across a seat, with one end thereof fixed to the body of a vehicle and the other end connected to a retractor mounted in the door to be taken up therein and with the central portion thereof hooked on hook apparatus provided in front of the seat, a solenoid device to operate the hook apparatus to release the belt and a solenoid device operating circuit, the solenoid device being actuated by the operating circuit for a predetermined period of time when a passenger is seated on the seat and the door is closed, whereby said belt is automatically engaged around the body of the passenger.

1 Claim, 4 Drawing Figures

SAFETY BELT DEVICE

BACKGROUND OF THE INVENTION

1. Field of the Invention

This invention relates to a safety belt device and more specifically to an automatically engaging safety belt device for use in automobiles.

2. Description of the Prior Art

Many types of safety belt devices have already been proposed for use in vehicles and airplanes and not a few of them have been put in practical use.

However, the safety belt device deliberately installed in a vehicle or airplane is, in many cases, not used by a passenger because of the cumbersomeness of engaging and disengaging operation, with the result that tragic traffic accidents continue to occur.

SUMMARY OF THE INVENTION

The present invention contemplates the provision of a novel automatically engaging safety belt device which is so designed that a safety belt is automatically engaged around the body of a passenger when the passenger is seated on a seat and a door is closed, whereby the body of the passenger is restrained by said safety belt.

According to the present invention, this object can be attained by a safety belt device which comprises a belt extended between the body of a vehicle and a door across a seat through a retractor and an anchor plate, hook means fixedly provided in front of said seat for hooking the central portion of said belt thereon, solenoid means for releasing said belt from engagement with said hook means and a solenoid operating circuit for operating said solenoid means for a predetermined period of time after the passenger is seated on the seat and the door is closed.

DESCRIPTION OF THE PREFERRED EMBODIMENT

Figure 1:
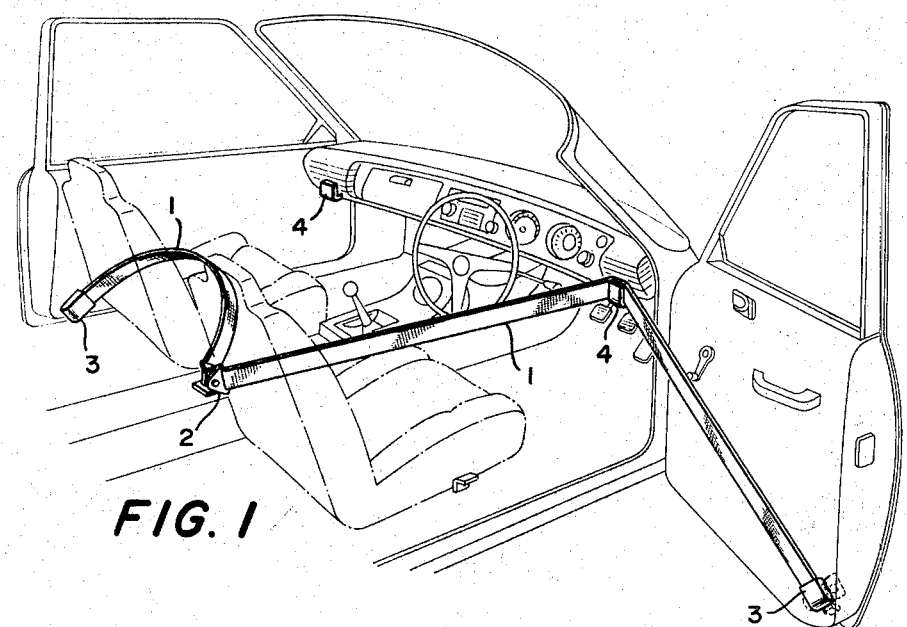
FIG. 1 is a fragmentary perspective view of the interior of an automobile equipped with the safety belt device of the present invention.

The present invention will be described by way of example with reference to the drawings.

Referring to the drawings, there is shown an embodiment of the present invention, in which the safety belt device of the invention is provided at separated front seats, i.e., a driver's seat and an assistant driver's seat, of an automobile.

With reference to FIG. 1, a belt 1 is fixed at one end to the central portion of the body of a vehicle through an anchor plate 2. The other end of the belt 1, as shown, is connected to a retractor 3, provided at the rear lower portion of a door, to be taken up therein. The retractor 3 is of a so-called emergency lock type which grasps the belt when a load abruptly acts thereon. A hook unit 4 is provided in front of the seat, for example, at a suitable location of a dash-board in the case of the embodiment shown. This hook unit 4 is provided for the purpose of hooking the belt 1 at its intermediate portion.

Figure 2:
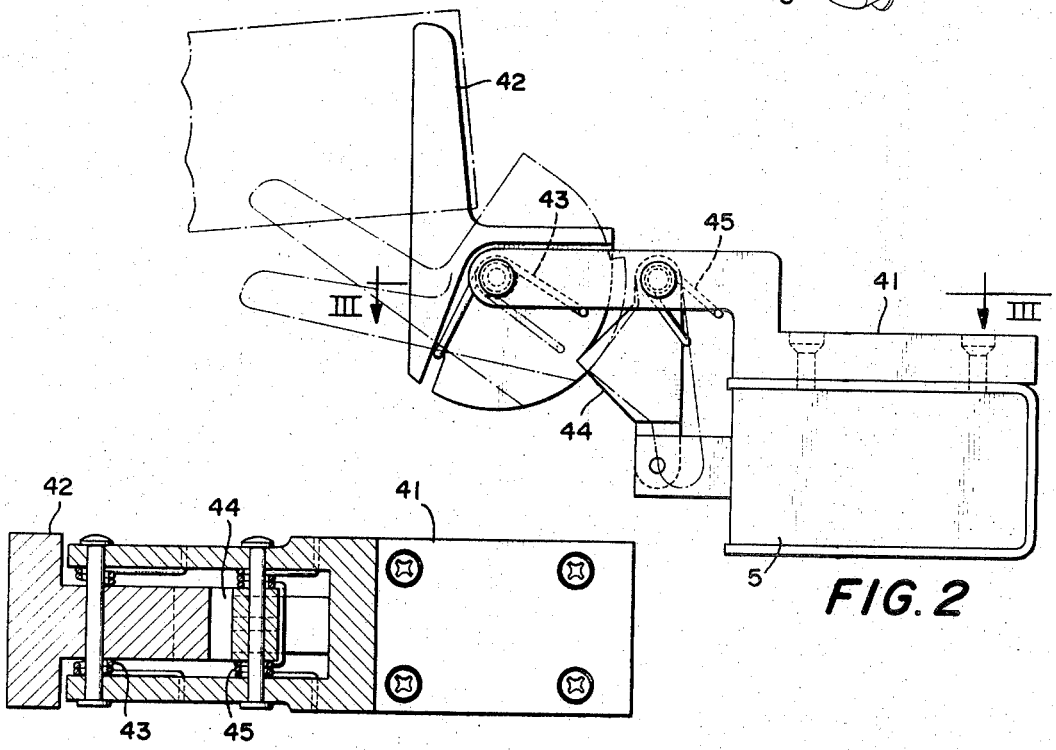
FIG. 2 is a side elevational view of the hook means.
Figure 3:
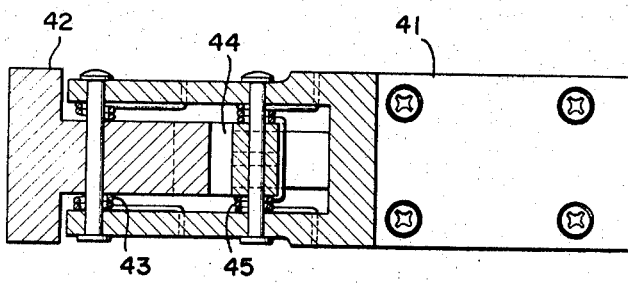
FIG. 3 is a top plan view of the hook means, partially shown in section taken along the line III—III of FIG. 2.

The details of the hook unit 4 are shown in FIGS. 2 and 3. The hook unit 4 shown is designed to be mounted on the front lower edge portion of the dashboard. A body 41 of the hook unit 4 is fixed to the dashboard. To the forward end of the body 41 is pivotally connected a hook 42 for hooking the belt 1. Between the body 41 and the hook 42 is disposed a spring 43 by which said hook 42 is normally held in a hooking position. A latch lever 44 formed with a pawl for engagement with a notch formed in the hook 42 is pivotally connected to the body 41. Between the body 41 and the latch lever 44 is disposed a spring 45 by which the latch lever 44 is normally urged toward the hook 42.

A free end of the latch lever 44 is connected to a solenoid means 5 fixed to the body 41.

Figure 4:
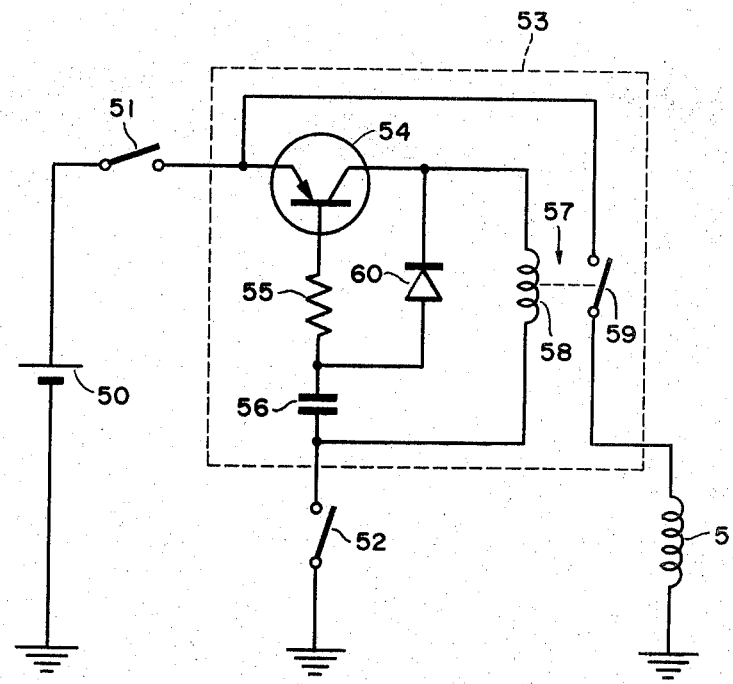
FIG. 4 is a solenoid operating circuit diagram.

An operating circuit for the solenoid means 5 is shown in FIG. 4. In the operating circuit shown, reference numeral 51 designates a seat switch which is closed when a passenger is seated on the seat. In the present invention, a door switch 52 is further mounted in a door lock and an arrangement is made such that the operating circuit for the solenoid means 5 will be closed only when both of the seat switch 51 and door switch 52 are closed. Reference numeral 53 designates a delay circuit unit for operating the solenoid means 5 in a short period of time, say 0.3 second, after both of the switches 51 and 52 have been closed.

The usual circuit for the delay circuit unit is shown in FIG. 4. The circuit 53 comprises a transistor 54, a condensor 56 connected to the base electrode of the transistor 54 and a relay 57 connected to the collector electrode. The door switch 52 is connected to the base electrode of the transistor 54 in series with the condensor 56 and a resistor 55 for establishing the time constant. The seat switch 51 is connected to the emitter electrode of the transistor 54 in series with the electric source 50 such as a battery. When the switches 51 and 52 are closed and the transistor 54 becomes conductive, an electric current will flow through the resistance 55 and the condensor 56. During the time the condensor 56 is charged with this current, the solenoid 58 of the relay 57 is energized by the collector current flow of the transistor 54 which has been made conductive. When the solenoid 58 is energized, the movable contact of the switch 59 is actuated to contact with the stationary contact of said relay 57, thereby the electric current flows through the solenoid 5. The electric current flowing through the solenoid 58 of the relay 57 is terminated when the charge to the condensor 56 is completed because if the charge current is terminated, the transistor 54 is made not conductive. As described above, the electric current through the solenoid 5 flows during a very short time such as less than one second. The time delay effect for the energizing of the solenoid coil 5 is carried out by inserting the resistance 55 into the line of the condensor 56.

During the flowing of the charge current through the resistance 55 and the condensor 56, if the switches 51 and/or 52 are opened, the transistor 54 will be turned "off" simultaneously. The condensor 56 is discharged when the transistor 54 is turned "off" to prepare the next charge operation.

The circuit 53 designated as the delay circuit unit is a conventional differential circuit.

During the charge operation of the condensor 56, if the door switch 52 is opened, the condensor 56 is discharged. When the condensor 56 is discharged, the discharge current flows through the diode 60 and the solenoid 58. However, as this discharge current is very minute, the relay 57 cannot be actuated.

Further, a travel detector switch, provided intermediate a speedometer cable or the like, is incorporated in the solenoid means operating circuit, whereby an abnormal state of the belt, such as the state in which the belt is held hooked on the hook unit during travel of the vehicle, can be completely avoided.

Now, the function of the safety belt device, constructed as described above, will be described hereunder:

First of all, the passenger when getting out of the vehicle hooks the belt 1 on the hook 42 of the hook unit 4, fixed to the dash-board, upon grasping the central portion of said belt. Thereafter, when the door is opened, the door switch 52 is opened, rendering the operating circuit for the solenoid means 5 inoperative, so that the hook 42 is retained in its hooking position, with the belt 1 being held in the hooked state. Therefore, the passenger can get out of the vehicle without interference from the belt 1.

When the door is closed after the passenger is out of the vehicle, the door switch 52 is closed but the seat switch 51 is held open, so that the solenoid means operating circuit remains inoperative and the hook 42 is held in its hooking position with the belt 1 hooked thereon.

Now, when the passenger opens the door to get into the vehicle, since the seat switch 51 is in its open position, the solenoid means is not actuated and the belt 1 is held hooked on the hook 42.

The solenoid means operating circuit is closed only after the seat switch 51 has been closed concurrently with the seating of the passenger on the seat and further the door switch 52 has been closed upon closure of the door. When the solenoid means 5 has thus been actuated, the engagement between the latch lever 44 and the hook 42 is released. At this moment, the hook 42 is turned down by the belt winding force of the retractor 3, releasing the belt 1. Thus, the belt 1 is engaged around the body of the passenger.

The hook 42 after releasing the belt 1 is returned to its original position by the action of the spring 43.

In this case, the solenoid means 5 is excited concurrently with closure of the door switch 52 and held excited for a short period of time, say 0.3 second, by the function of the delay circuit unit 53. After passage of this period of time, the solenoid means 5 is deenergized and the latch lever 44 is returned to its original position under the biasing force of the spring 45. The pawl of the latch lever 44 engages the notch of the hook 42 as said hook returns to its original position, thus retaining said hook 42 in its position.

Although the present invention has been described and illustrated herein by way of example as applied to the front seat of a vehicle, it will be obviously understood that it will be applicable also to the rear seat of the vehicle after a slight modification of the design thereof. It will also be understood that the same effect can be obtained by fixing the belt to the door and mounting the retractor on the vehicle body. Further, it will be understood that the present invention is applicable, not only to automobiles but also to airplanes and other vehicles.

As may be understood from the foregoing description, the safety belt device according to the present invention is of an automatically engaging type which restrains the body of a passenger automatically when the passenger gets into the vehicle and, therefore, has the advantages that it is quite effective for enhancing traffic safety and that it is relatively simple in construction and highly reliable in operation.

We claim:

1. A safety belt device comprising a belt extended between the body of a vehicle and a door across a seat through a retractor and an anchor plate, hook means fixedly provided on a part of said body in front of said seat for hooking the central portion of said belt thereon, solenoid means for operating said hook means for releasing said belt from engagement with said hook means when said hook means is operated, a first switch closed by closing the door of the vehicle, a second switch closed by the seating of a passenger on said seat, and an electric circuit connected to said solenoid means and driven by the closing of the first and second switches to energize said solenoid means for a predetermined period of time.

* * * * *